US009359964B2

(12) United States Patent
Glugla et al.

(10) Patent No.: US 9,359,964 B2
(45) Date of Patent: Jun. 7, 2016

(54) CONTROLLED TRANSIENT ACCELERATION TO EVACUATE CONDENSATE FROM A CHARGE AIR COOLER

(71) Applicant: Ford Global Technologies, LLC, Dearborn, MI (US)

(72) Inventors: Chris Paul Glugla, Macomb, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 13/708,831

(22) Filed: Dec. 7, 2012

(65) Prior Publication Data

US 2014/0157772 A1 Jun. 12, 2014

(51) Int. Cl.
*F02B 33/44* (2006.01)
*F02B 29/04* (2006.01)
*F02D 41/00* (2006.01)
*F02D 41/10* (2006.01)
*F02M 25/07* (2006.01)
*F02D 13/02* (2006.01)

(52) U.S. Cl.
CPC ............ *F02D 41/0007* (2013.01); *F02B 29/04* (2013.01); *F02B 29/0406* (2013.01); *F02B 29/0468* (2013.01); *F02D 13/0219* (2013.01); *F02D 41/10* (2013.01); *F02D 2200/0418* (2013.01); *F02M 25/0707* (2013.01); *Y02T 10/144* (2013.01); *Y02T 10/146* (2013.01)

(58) Field of Classification Search
CPC .. F02B 29/04; F02B 29/0406; F02B 29/0468; F02D 41/0007; F02D 41/10; F02D 13/0219; F02D 2200/0418; F02M 25/0707; Y02T 10/144; Y02T 10/146
See application file for complete search history.

(56) References Cited

U.S. PATENT DOCUMENTS

| | | | | |
|---|---|---|---|---|
| 6,786,210 | B2 * | 9/2004 | Kennedy et al. | 123/568.12 |
| 7,163,005 | B2 * | 1/2007 | Tussing et al. | 123/568.12 |
| 7,980,076 | B2 | 7/2011 | Buia et al. | |
| 8,061,135 | B2 * | 11/2011 | Rutherford | 60/599 |
| 2010/0326408 | A1 * | 12/2010 | Clarke et al. | 123/568.21 |
| 2011/0023842 | A1 * | 2/2011 | Kurtz | 123/568.12 |
| 2011/0107760 | A1 * | 5/2011 | Quinn et al. | 60/599 |
| 2013/0220289 | A1 * | 8/2013 | Maceroni | F02M 35/10255 123/568.12 |
| 2014/0047833 | A1 * | 2/2014 | Buckland et al. | 60/599 |
| 2014/0100758 | A1 * | 4/2014 | Glugla et al. | 701/103 |
| 2014/0102424 | A1 * | 4/2014 | Norman | F02B 29/0468 123/542 |
| 2014/0109568 | A1 * | 4/2014 | Glugla et al. | 60/599 |
| 2014/0109870 | A1 * | 4/2014 | Glugla et al. | 123/406.11 |

OTHER PUBLICATIONS

Cockerill, Charles A. et al., "Charge Air Cooler Control System and Method," U.S. Appl. No. 13/567,979, filed Aug. 6, 2012, 33 pages.

(Continued)

*Primary Examiner* — Thai Ba Trieu
*Assistant Examiner* — Paolo Isada
(74) *Attorney, Agent, or Firm* — Julia Voutyras; Alleman Hall McCoy Russell & Tuttle LLP (57) ABSTRACT

Methods and systems are provided for purging condensate from a charge air cooler. In response to condensate in a charge air cooler during a tip-in, airflow is increased at a controlled rate to the intake manifold, purging condensate from the charge air cooler.

19 Claims, 4 Drawing Sheets

(56) References Cited

OTHER PUBLICATIONS

Glugla, Chris Paul et al., "Method for Controlling a Variable Charge Air Cooler," U.S. Appl. No. 13/589,942, filed Aug. 20, 2012, 41 pages.

Surnilla, Gopichandra et al., "Engine Control Coordination with Grille Shutter Adjustment and Ambient Conditions," U.S. Appl. No. 13/656,542, filed Oct. 19, 2012,, 33 pages.

Glugla, Chris Paul et al., "Condensation Control in a Charge Air Cooler by Controlling Charge Air Cooler Temperature," U.S. Appl. No. 13/664,246, filed Oct. 30, 2012, 49 pages.

* cited by examiner

CONTROLLED TRANSIENT ACCELERATION TO EVACUATE CONDENSATE FROM A CHARGE AIR COOLER

BACKGROUND/SUMMARY

Turbocharged and supercharged engines may be configured to compress ambient air entering the engine in order to increase power. Compression of the air may cause an increase in air temperature, thus, a charge air cooler may be utilized to cool the heated air thereby increasing its density and further increasing the potential power of the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire.

Other attempts to address engine misfire due to condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. Another method to prevent engine misfire due to condensate ingestion includes trapping and/or draining the condensate from the CAC. While this may reduce condensate levels in the CAC, condensate is moved to an alternate location or reservoir, which may be subject to other condensate problems such as freezing and corrosion.

In one example, the issues described above may be addressed by a method for purging condensate from a CAC during an acceleration event. For example, during the acceleration event, when the condensate level in the CAC is above a threshold level, a controller may limit an increase in engine airflow. In this way, the rate of condensate ingestion into the engine may be controlled, reducing the chance of engine misfire, or unstable combustion.

As one example, when the condensate level in the CAC is above a first threshold level, an increase in engine airflow may be limited during an acceleration event. The acceleration event may include a tip-in and be indicated by an increase in pedal position beyond a threshold. The limiting of engine airflow may include controlling the opening of a throttle to a determined rate of increase in engine airflow. This rate of increase in engine airflow may be adjusted based on the level of condensate in the CAC and a target condensate ingestion rate. Limiting of engine airflow may stop when the condensate level in the charge air cooler decreases below a second threshold level.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
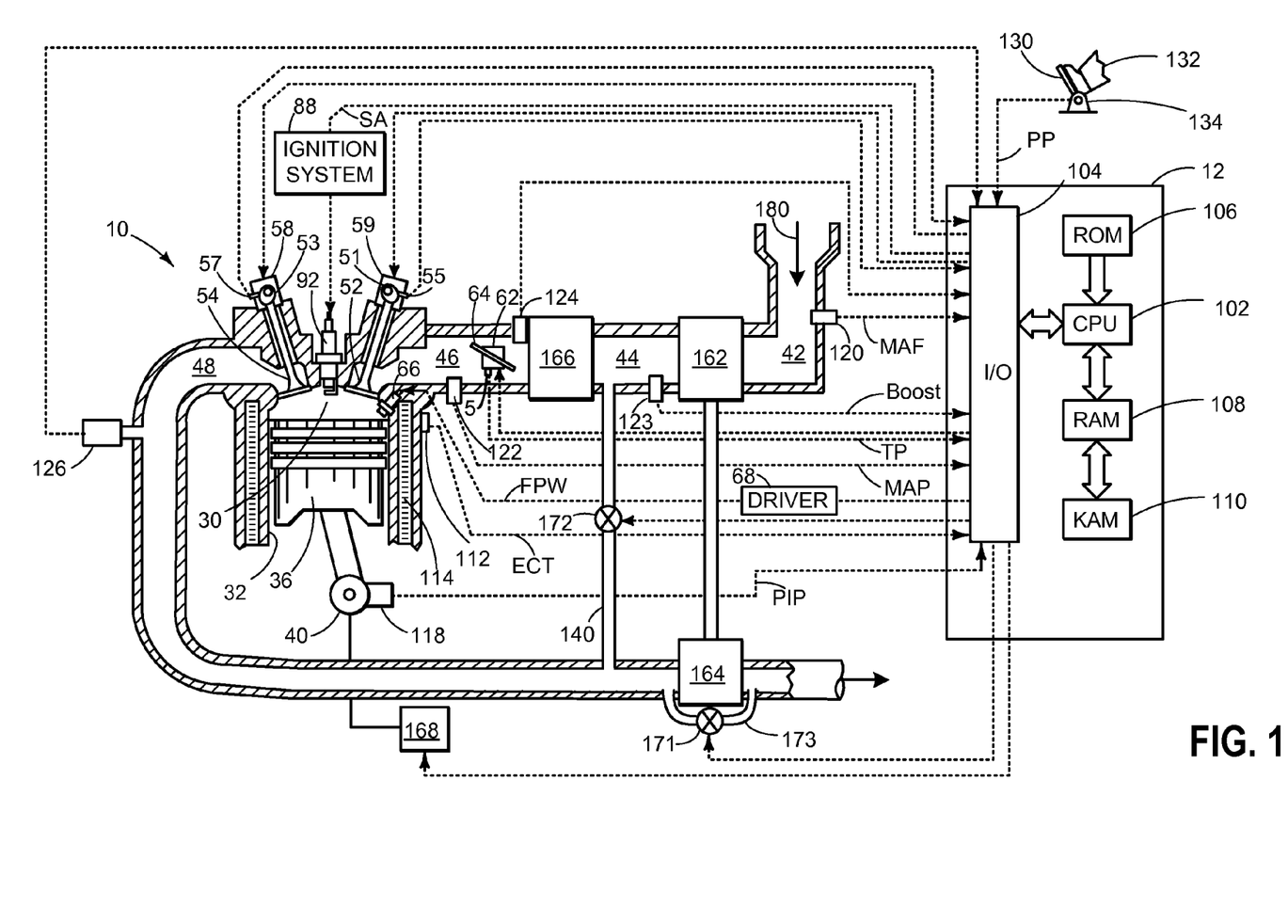
FIG. 1 is a schematic diagram of an example engine system including a charge air cooler.
Figure 2:
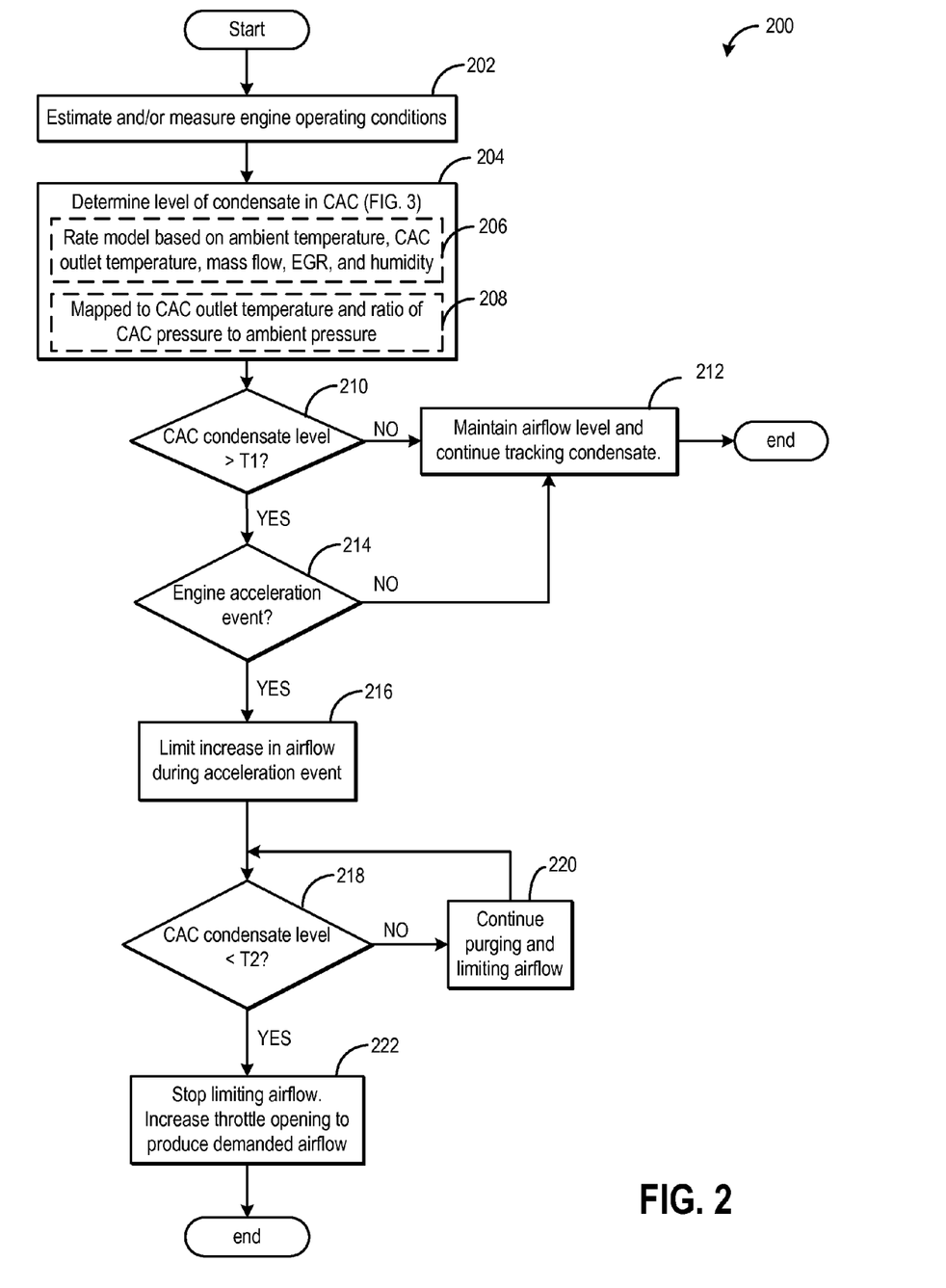
FIG. 2 shows a flow chart of a method for purging condensate from a CAC during different driving conditions.

The following description relates to systems and methods for purging condensate from a charge air cooler (CAC) to an engine system, such as the system of FIG. 1. In response to a condensate level in the CAC, an increase in engine airflow during vehicle acceleration may be limited to reduce the chance of engine misfire. The level or amount of condensate in the CAC may be determined by a method presented at FIG. 3. FIG. 2 presents an example method for controlling the increase in engine airflow responsive to CAC condensate and an acceleration event. Example CAC purging operations based on engine operating conditions are shown at FIG. 4.

Referring now to FIG. 1, internal combustion engine 10, comprising a plurality of cylinders, one cylinder of which is shown in FIG. 1, is controlled by electronic engine controller 12. Engine 10 includes combustion chamber (cylinder) 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57. In this way, controller 12 may control the cam timing through phasers 58 and 59. Variable cam timing (VCT) may be either advanced or retarded, depending on various factors such as engine load and engine speed (RPM).

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Air intake 42 may be part of an induction system which draws in intake air 180 from one or more ducts (not shown in FIG. 1).

Exhaust gases spin turbine 164 which is coupled to compressor 162 which compresses air in boost chamber 44. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Turbocharger waste gate 171 is a valve that allows exhaust gases to bypass turbine 164 via bypass passage 173 when turbocharger waste gate 171 is in an open state. Substantially all exhaust gas passes through turbine 164 when waste gate 171 is in a fully closed position.

Further, in the disclosed embodiments, an exhaust gas recirculation (EGR) system may route a desired portion of exhaust gas from exhaust manifold 48 to intake boost chamber 44 via EGR passage 140. The amount of EGR provided to intake boost chamber 44 may be varied by controller 12 via EGR valve 172. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below. Specifically, EGR contains a large amount of water as it is a combustion by-product. Since EGR is at a relatively high temperature and contains a lot of water, the dew-point temperature may also be relatively high. Consequently, condensate formation from EGR can even be much higher than condensate formation from compressing air and lowering it to the dew-point temperature.

Intake boost chamber 44 may further include charge air cooler (CAC) 166 (e.g., an intercooler) to decrease the temperature of the turbocharged or supercharged intake gases. In some embodiments, CAC 166 may be an air to air heat exchanger. In other embodiments, CAC 166 may be an air to liquid heat exchanger. CAC 166 may include a valve to selectively modulate the flow velocity of intake air traveling through the charge air cooler 166 in response to condensation formation within the charge air cooler.

Hot charge air from the compressor 162 enters the inlet of the CAC 166, cools as it travels through the CAC 166, and then exits to pass though the throttle 62 and into the engine intake manifold 46. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point.

When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be purged into the engine during selected engine operating conditions, such as during acceleration events. However, if the condensate is introduced at once into the engine during an acceleration event, there may be an increase in the chance of engine misfire or combustion instability (in the form of late/slow burns) due to the ingestion of water. Thus, as elaborated herein with reference to FIGS. 2-4, condensate may be purged from the CAC to the engine under controlled conditions. This controlled purging may help to reduce the likelihood of engine misfire events. In one example, condensate may be purged from the CAC using increased airflow during a tip-in condition. By controlling the increase in airflow through the CAC during the tip-in, condensate may be purged from the CAC without causing misfire. Methods for purging condensate during an acceleration condition and controlling the rate of increase in airflow are presented in further detail below with regard to FIGS. 2-4.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164. Alternatively, a two-state exhaust gas oxygen sensor may be substituted for UEGO sensor 126.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine. The electric motor may be used during purging operations, described further below, to maintain a driver torque demand.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. During the expansion stroke, the expanding gases push piston 36 back to BDC. Crankshaft 40 converts piston movement into a rotational torque of the rotary shaft. Crankshaft 40 may be used to drive alternator 168. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, an electronic storage medium for executable programs and calibration values shown as read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a pedal position sensor 134 coupled to an accelerator pedal 130 for sensing force applied by vehicle operator 132; a measurement of engine manifold absolute pressure (MAP) from pressure sensor 122 coupled to intake manifold 46; a measurement of boost pressure (Boost) from pressure sensor 123; a measurement of inducted mass air flow (MAF) from mass air flow sensor 120; a measurement of throttle position (TP) from a sensor 5; and temperature at the outlet of a charge air cooler 166 from a temperature sensor 124. Barometric pressure may also be sensed (sensor not shown) for processing by controller 12. In a preferred aspect of the present description, engine position sensor 118 produces a profile ignition pickup signal (PIP). This produces a predetermined number of equally spaced pulses every revolution of the crankshaft from which engine speed (RPM) can be determined. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. Other sensors not depicted may also be present, such as a sensor for determining the intake air velocity at the inlet of the charge air cooler, and other sensors.

Furthermore, controller 12 may communicate with various actuators, which may include engine actuators such as fuel injectors, an electronically controlled intake air throttle plate, spark plugs, camshafts, etc. Various engine actuators may be controlled to provide or maintain torque demand as specified by the vehicle operator 132. These actuators may adjust certain engine control parameters including: variable cam timing (VCT), the air-to-fuel ratio (AFR), alternator loading, spark timing, throttle position, etc. For example, when an increase in PP is indicated (e.g., during a tip-in) from pedal position sensor 134, torque demand is increased.

In response to an acceleration condition, such as a tip-in, controller 12 may increase the opening of throttle 62, increasing the airflow through the CAC and into the engine intake. An acceleration event or tip-in may be indicated by an increase in pedal position. As such, if pedal position is beyond a threshold position, or the rate of change in the throttle position is indicative of an aggressive increase in demanded torque, a tip-in and increase in airflow may result. As elaborated herein at FIGS. 2 and 4, the increased airflow during a tip-in may purge condensate from the CAC to the engine intake manifold. If the airflow rate increases too quickly, condensate may be blown off into the engine at an increased rate and cause engine misfire. Thus, by controlling the rate of increase in airflow during a tip-in, the rate of condensate purging and engine misfire may be reduced.

The controller may set an engine airflow (airflow) rate limit or a rate of increase in airflow limit during a tip-in. By controlling the opening of the throttle during the tip-in, a set rate of increase in engine airflow may be achieved. Alternatively, or additionally, an engine load limit may be set during the tip-in and purging. The set rate of increase in airflow may be based on the amount or level of condensate in the CAC and/or a target condensate ingestion rate. Further, the duration of limiting the increase in airflow during purging may be based on the amount of condensate in the CAC. For example, if the amount of condensate in the CAC is higher, the rate of increase in airflow may be slower and the duration of limiting may be longer. Thus, the limiting of the increase in airflow during a tip-in may increase with an increasing level of condensate in a CAC. In another example, the rate of increase in airflow may correspond to a target condensate ingestion rate. For example, there may be a threshold condensate ingestion rate that may cause engine misfire. Therefore, as this threshold condensate ingestion rate increases, the rate of increase in airflow may decrease (e.g., limited more). As such, the duration of limiting airflow may be the minimum duration to purge an amount of condensate from the CAC while reducing the chance of misfire.

As pedal position increases, indicating a tip-in, torque demand may also increase. Engine airflow may be limited during the tip-in to control purging; however, boost level may continue to increase during the limiting. Additionally, if the vehicle is a hybrid vehicle, the electric motor may be used to compensate for the limited increase in airflow and maintain torque. After condensate purging is complete, airflow limiting may terminate and the boost may be used to increase torque to the demanded level in a controlled manner. For example, boost and throttle opening may be increased at a controlled rate as to not cause a rapid increase in torque. Condensate purging may be complete after substantially all the condensate is purged from the CAC. Alternatively, condensate purging may be complete after condensate in the CAC falls below a second threshold level, or after the engine load reaches a level that can accommodate increased condensate ingestion without degraded combustion.

In this way, in response to a condensate level above a first threshold level, the increase in engine airflow may be limited during an acceleration event. The limiting of engine airflow may include controlling the opening of a throttle to a set rate of increase in engine airflow, based on the amount of condensate in the CAC. The limiting engine airflow may be stopped or reduced when the condensate level in the CAC decreases below a second threshold level. Alternatively, the limiting engine airflow may be stopped or reduced when the acceleration event ends. This may be indicated by a decrease in pedal position. Turning now to FIG. 2, a method 200 for purging condensate from a CAC during different driving conditions is presented. Specifically, during an acceleration event, the controller may limit the increase in airflow when condensate in the CAC is above a first threshold level.

The method begins at 202 by estimating and/or measuring engine operating conditions. Engine operating conditions may include engine speed and load, engine temperature, throttle position, air mass flow, engine airflow rate, CAC conditions (inlet and outlet temperature, inlet and outlet pressure, etc.), ambient temperature and humidity, MAP, pedal position, and boost level. At 204, the routine may determine the level of condensate in the CAC, based on this data. In one example, at 206, and as further elaborated at the model at FIG. 3, a rate of condensate formation within the CAC may be based on ambient temperature, CAC outlet temperature, air mass flow, EGR, and humidity. This may then be used to calculate the amount or level of condensate in the CAC. In another example, at 208, a condensation formation value may be mapped to CAC outlet temperature and a ratio of CAC pressure to ambient pressure. It should be noted that such an approach can be especially advantages because the engine may operate in a condition where the engine operates at an engine load of approximately 0.8 (with 1 being maximum naturally aspirated cylinder load), pre-throttle pressures can still be greater than ambient pressure with manifold pressures slightly below atmospheric (the are still making vacuum). This means it is possible that even though the engine might be operating at a load and torque output in the range a normally aspirated engine, the CAC induction system can still be pressurized below the dewpoint. The induction pressure or pressure ratio can therefore provide a more accurate indication of the dewpoint change below the condensate level, since merely using engine load might not be indicative of the pressure in the CAC.

In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

Returning to FIG. 2, at 210, the routine determines if the CAC condensate level (e.g., amount of condensate in the CAC) is above a first threshold level, T1. If the CAC condensate level is not about first threshold level T1, the routine maintains the engine airflow level and continues to track the condensate level at 212. However, if the CAC condensate level is greater than first threshold level T1, the routine continues on to 214 to determine if there is an acceleration event.

An acceleration event may be determined by assessing pedal position, or more specifically, a change in pedal position. For example, a pedal position rate of change beyond a threshold rate of change may indicate an acceleration event, which may include a tip-in. Alternatively, if pedal position rate of change is less than the threshold rate of change, there may not be a tip-in or an acceleration event. If there is not an acceleration event at 214 (e.g., rate of change in pedal position less than a threshold rate of change), the controller may maintain the engine airflow level and continue tracking condensate at 212. However, if there is an acceleration event at 214, the routine continues on to 216 to limit the increase in engine airflow during the acceleration event. The limiting of engine airflow may include limiting or controlling the opening of a throttle. For example, the opening of the throttle may be controlled to achieve a set rate of increase in engine airflow. In other examples, the limiting may include setting an engine load limit. The set rate of increase in engine airflow may be based on the level of condensate in the CAC and/or a target condensate ingestion rate. For example, the rate of increase in engine airflow may be the fastest rate the engine may ingest the amount of condensate in the CAC without causing misfire. In this way, a larger amount of condensate may result in a slower rate of increase in engine airflow.

The routine continues on to 218 to determine if the level of condensate in the CAC has dropped below a second threshold level T2. In some embodiments, this level may be zero such that no condensate remains in the CAC. In other embodiments, this level may be something greater than zero but small enough to reduce the likelihood of engine misfire. If the CAC condensate level has not yet reached second threshold level T2, the routine continues purging by limiting airflow at 220. Once the CAC condensate level falls below second threshold level T2, the routine continues on to 222 where the controller may stop limiting engine airflow. If the vehicle is still accelerating, the tip-in may continue at the requested torque level. As such, throttle position may be adjusted to provide a requested airflow level. Alternatively at 216, the purging and limiting airflow may continue for a set duration. The duration may be based on the amount of condensate in the CAC. In another example, the limiting of engine airflow and condensate purging at 216 may end when the tip-in or acceleration event concludes. For example, if pedal position decreases such that the vehicle is no longer accelerating, condensate purging may stop due to a decrease in airflow.

Figure 3:
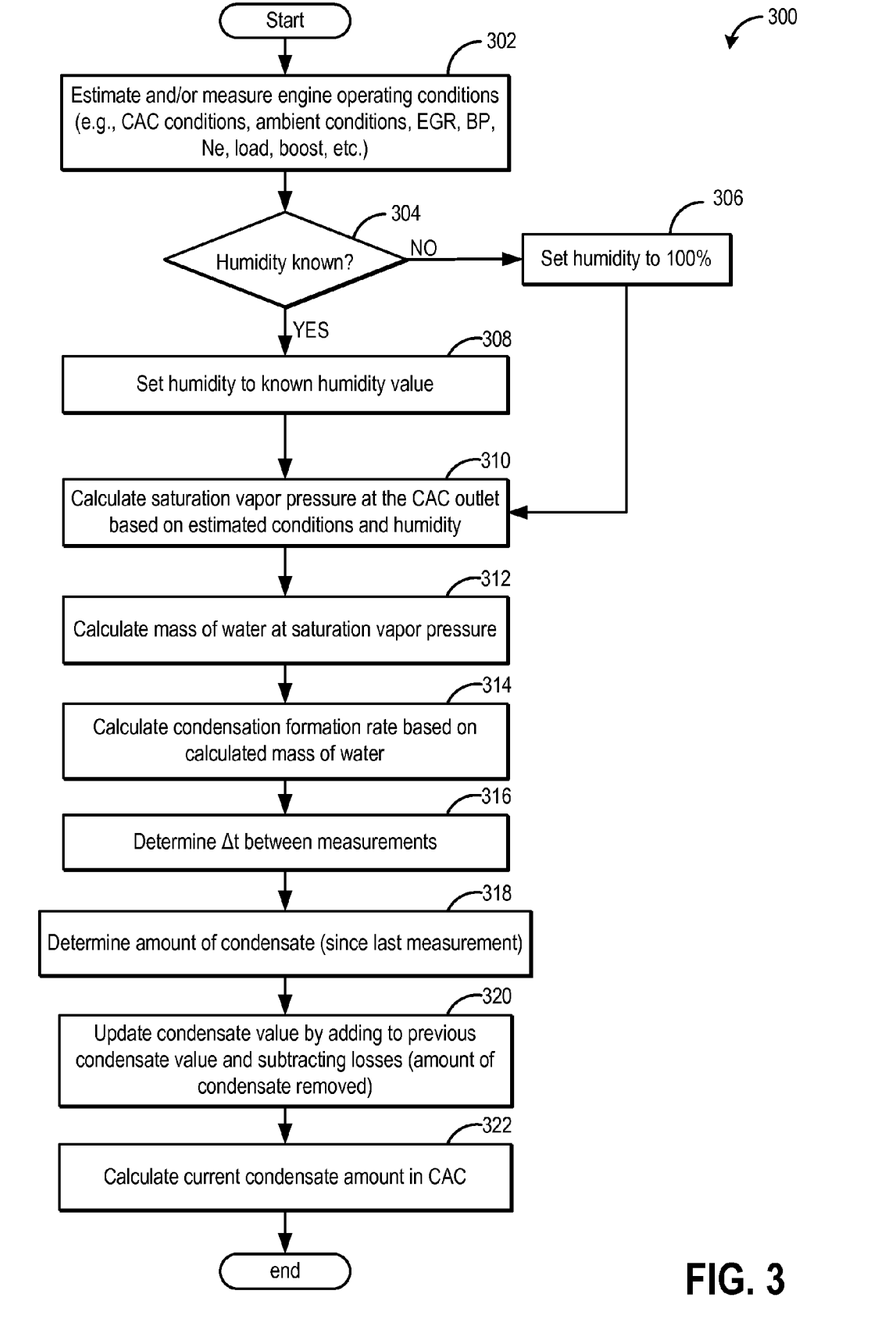
FIG. 3 shows a flow chart illustrating a method for determining the amount of condensate within a CAC according to an embodiment of the present disclosure.
Figure 4:
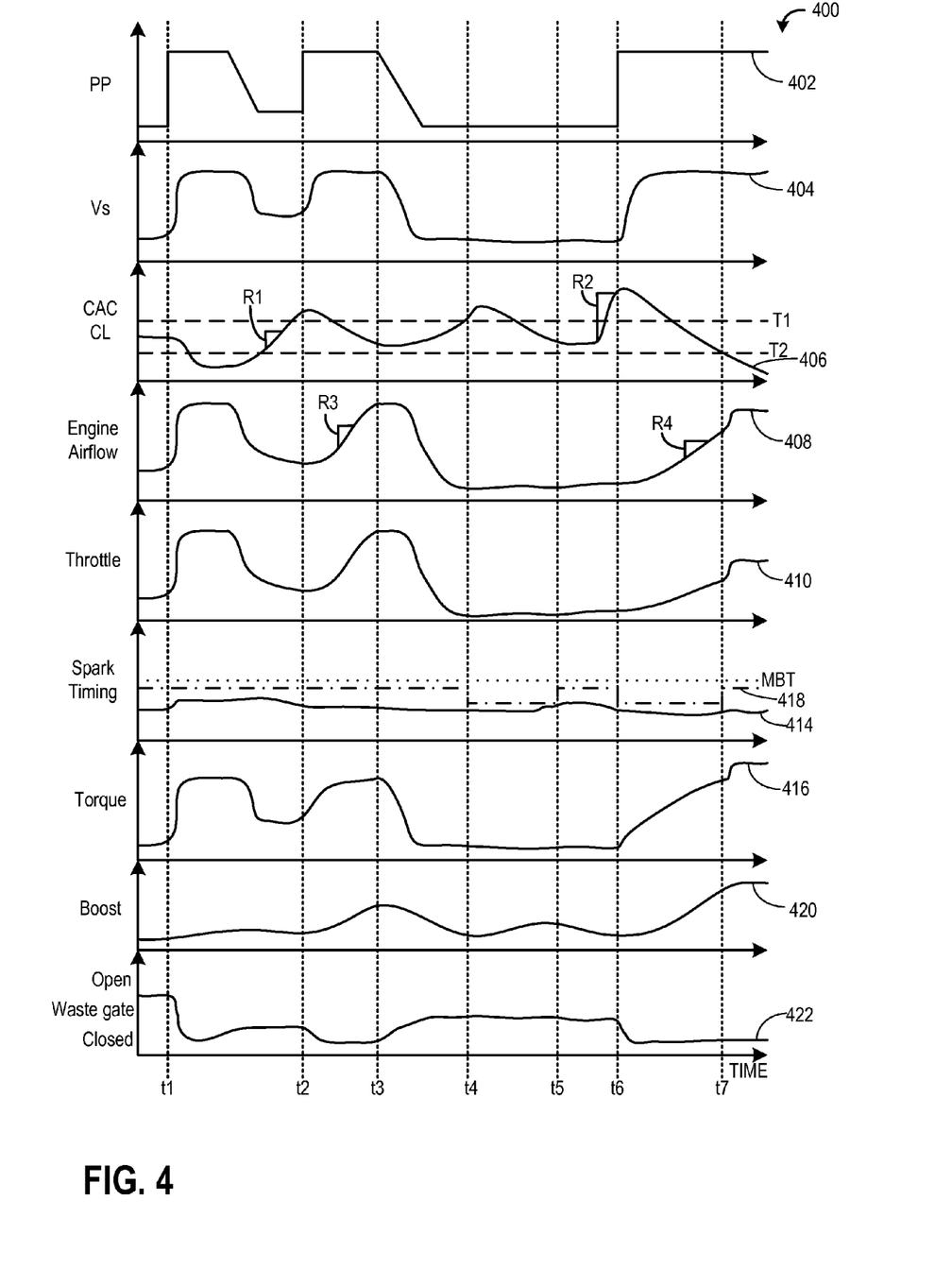
FIG. 4 shows a graphical example of CAC purging operations during different driving conditions.

FIG. 3 illustrates a method 300 for estimating the amount of condensate stored within a CAC. Based on the amount of condensate at the CAC relative to a threshold value, increase in engine airflow during an acceleration event may be controlled with the routine shown at FIG. 2.

The method begins at 302 by determining the engine operating conditions. These may include, as elaborated previously at 202, ambient conditions, CAC conditions (inlet and outlet temperatures and pressures, flow rate through the CAC, etc.), mass air flow, MAP, EGR flow, engine speed and load, engine temperature, boost, etc. Next, at 304, the routine determines if the ambient humidity (humidity) is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set at 306 to 100%. In an alternate embodiment, the humidity may be estimated based on inferred conditions, such as CAC efficiency and windshield wiper speed. However, if the humidity is known, the known humidity value, as provided by the humidity sensor, may be used as the humidity setting at 308.

The ambient temperature, pressure, and humidity may be used to determine the dew point of the intake air, which may be further affected by the amount of EGR in the intake air (e.g., EGR may have a different humidity and temperature than the air from the atmosphere). The difference between the dew point, the pressure at CAC outlet, and the CAC outlet temperature indicates whether condensation will form within the cooler, and the mass air flow may affect how much condensation actually accumulates within the cooler. At 310, an algorithm may calculate the saturation vapor pressure at the CAC outlet as a function of the CAC outlet temperature and pressure. The algorithm then calculates the mass of water at this saturation vapor pressure at 312. Finally, the condensation formation rate at the CAC outlet is determined at 314 by subtracting the mass of water at the saturation vapor pressure condition at the CAC outlet from the mass of water in the ambient air. By determining the amount of time between condensate measurements at 316, method 300 may determine the amount of condensate within the CAC since a last measurement at 318. The current condensate amount in the CAC is calculated at 322 by adding the condensate value estimated at 318 to the previous condensate value and then subtracting any condensate losses since the last routine (that is, an amount of condensate removed, for example, via purging routines) at 320. Condensate losses may be assumed to be zero if the CAC outlet temperature was above the dew point. Alternatively, at 320, the amount of condensate removed may be modeled or determined empirically as a function of air mass and integrated down with each software task loop (that is, with each run of routine 300).

Now turning to FIG. 4, graph 400 shows example CAC purging operations during different driving conditions. Specifically, graph 400 shows a change in pedal position (PP) indicative of an operator torque demand at plot 402, a corresponding change in vehicle speed is shown at plot 404, a change in engine airflow is shown at plot 408, a change in throttle position is shown at plot 410, an engine output torque is shown at plot 416, a boost level is shown at plot 420, and a change in position of a waste gate (e.g., between fully open and fully closed) is shown at plot 422. The condensate level in a CAC is shown at plot 406. Finally, adjustments to spark timing are shown at plot 414. Spark timing may be advanced or retarded from MBT. A borderline knock limit 418 may change based on engine operating conditions, including the temperature of the intake air.

Prior to time T1, pedal position may be at a low level (plot 402), resulting in a low vehicle speed (plot 404), decreased engine airflow (plot 408), a small throttle opening (plot 410), and low output torque (plot 416). The condensate level in the CAC may be below first threshold level T1 (plot 406). At time T1, pedal position may increase, indicating a tip-in (plot 402). CAC condensate level may be below first threshold T1 (plot 406). Therefore, throttle opening may increase (plot 410), increasing engine airflow (plot 408). Since CAC condensate was not above first threshold T1, the increase in engine airflow is not limited during the tip-in at time T1. Vehicle speed (plot 404) and torque (plot 416) may also increase due to the tip-in at time t1.

Between time T1 and time T2, CAC condensate level may be increasing at rate R1 (plot 406). Just before time T2, the level of condensate in the CAC may increase above first threshold level T1. At time T2, another tip-in may occur, as indicated by the large increase in pedal position (plot 402). In response to the condensate level in the CAC above first threshold level T1 and the increase in pedal position, engine airflow may increase at a controlled rate R3 to purge the condensate during the tip-in. The controlled rate R3 may be achieved by limiting the opening of the throttle (plot 410). During the limiting the opening of the throttle, the waste gate may be closed (plot 422) and the boost level may continue to increase (plot 420). The limiting of engine airflow and purging CAC condensate may continue until the tip-in concludes at time t3.

At time T4, condensate may increase above first threshold T1 (plot 406). Pedal position may remain constant and below a threshold at time T4 (plot 402). As a result, engine airflow may remain at the demanded level. Before time T6, the CAC condensate level increases above first threshold level T1 at rate R2 (plot 406). At time T6, another tip-in may occur as indicated by the rapid increase in pedal position (plot 402). During the tip-in, engine airflow may be limited to a rate of airflow increase R4 by limiting the opening of the throttle (plot 410). This rate may be slower than the controlled rate R3 during the tip-in at time T2 since the amount (or level) of condensate in the CAC is greater at time T6 than time T2. The throttle may also open at a slower rate at time T6 to achieve the slower rate of increase in airflow (plot 410). Thus, more limiting of engine airflow may occur during the tip-in at time T6 than the tip-in at time T2. The waste gate may close at time T6. As a result, during the limiting of airflow between time T6 and T7, boost level may continue to increase.

The CAC condensate level may decrease at a steady rate until time T7 when it falls below second threshold level T2. In response, the controller may stop limiting airflow. The vehicle may still be accelerating at time T7, causing the throttle opening and engine airflow to increase quickly to the requested level. The torque level may increase quickly at time T7 as a result of the stored boost during the limiting of airflow. In one embodiment, the transition from clipped airflow (e.g., airflow limiting) to no airflow limiting may follow a controlled time constant so torque delivery is smooth and relatively linear. If any condensate remains in the CAC, it may be purged at the increased airflow without causing misfire.

In this way, during a first condition, an increase in engine airflow may be limited in response to a condensate level in a CAC above a first threshold level. During a second condition, engine airflow may be maintained at a demanded level. The first condition may include a tip-in when pedal position, or change in pedal position, is greater than a threshold, as shown at time T2 and time T6. The second condition may include when the vehicle is not accelerating or when pedal position is less than a threshold, as shown at time T4. The limiting of the increase in airflow may increase with an increasing level of condensate in the CAC, as shown at time T6. In this example, the engine airflow may increase at a slower rate of airflow increase R4.

In this way, condensate may be purged from a CAC during a tip-in by limiting the increase in engine airflow. The limiting of engine airflow may be responsive to the amount of condensate in the CAC. The limiting may include limiting the opening on an intake throttle during the tip-in. Once the tip-in concludes or the level of condensate in the CAC decreases below a threshold, the limiting may stop and airflow may be returned to the demanded level. As such, purging condensate from the CAC by controlling the rate of increase in engine airflow may control a condensate ingestion rate and reduce engine misfire events.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method of controlling airflow supplied into an engine, comprising:

via an electronic controller:

measuring one or more engine operating conditions and a pedal position from a vehicle operator;

determining a demanded torque based on the pedal position;

determining a condensate level in a charge air cooler based on the one or more engine operating conditions, where the charge air cooler is positioned downstream of a compressor;

in response to an increase in the demanded torque and the determined condensate level increasing above a first threshold level in a charge air cooler, limiting an increase in engine airflow to a determined rate of increase in engine airflow to reach the increase in the demanded torque based on the determined condensate level, via controlling an actuator to adjust an intake throttle opening; and in response to the determined condensate level not being above the first threshold level, maintaining engine airflow at a demanded level of airflow to reach the increase in the demanded torque without limiting to the determined rate.

2. The method of claim 1, wherein the increase in the demanded torque includes a driver pedal tip-in.

3. The method of claim 1, wherein the condensate level is an amount of condensate in the charge air cooler.

4. The method of claim 1, wherein the intake throttle is arranged downstream of the charge air cooler.

5. The method of claim 1, wherein the determined rate of increase in engine airflow is adjusted based on each of the determined condensate level in the charge air cooler and a target condensate ingestion rate.

6. The method of claim 1, wherein the controller reduces the limiting responsive to the determined condensate level in the charge air cooler decreasing below a second threshold level.

7. The method of claim 6, further comprising, after reducing the limiting, increasing boost and the intake throttle opening at a controlled rate via the controller adjusting one or more actuators to increase torque to the demanded torque during the increase in the demanded torque.

8. The method of claim 1, wherein the controller reduces the limiting in response to the increase in the demanded torque ending as detected by one or more sensors including a pedal position sensor.

9. The method of claim 1, wherein the limiting further includes the controller limiting engine load by adjusting one or more engine actuators.

10. The method of claim 1, further comprising increasing a boost level during the limiting by the controller adjusting a turbocharger wastegate actuator.

11. The method of claim 1, wherein the charge air cooler is positioned downstream of a compressor and upstream of the intake throttle.

12. A method of controlling airflow supplied into an engine, comprising:
measuring one or more engine operating conditions and a pedal position from a vehicle operator via a controller;
determining a condensate level in a charge air cooler based on the one or more engine operating conditions via the controller;
in response to the determined condensate level in a charge air cooler being above a first threshold level, and an increase in demanded torque including a rate of change in the pedal position being greater than a threshold rate of change, limiting an increase in engine airflow to a set rate of increase in engine airflow limit to reach the increased demanded torque based on the determined condensate level above the first threshold level via the controller controlling an actuator to adjust an opening of an air intake throttle and,
in response to the determined condensate level not being above the first threshold level, maintaining engine airflow at a demanded level of airflow passing through the opening of the air intake throttle to reach the increased demanded torque without limiting to the set rate.

13. The method of claim 12, further comprising, in response to the rate of change in the pedal position being less than the threshold rate of change and the determined condensate level in the charge air cooler being above the first threshold, maintaining engine airflow at the demanded level of airflow and not limiting to the set rate via the controller controlling the actuator to adjust the opening of the air intake throttle.

14. The method of claim 12, wherein the limiting the increase in engine airflow increases with an increasing determined level of condensate in the charge air cooler.

15. The method of claim 12, wherein the controller reduces the limiting responsive to one of the determined condensate level in the charge air cooler being below a second threshold level and a decrease in pedal position.

16. A method of controlling airflow supplied into an engine, comprising:
via an electronic controller:
measuring one or more engine operating conditions and a pedal position from a vehicle operator;
determining a condensate level in a charge air cooler based on the one or more engine operating conditions;
determining a demanded torque based on the pedal position; determining a rate of increase in engine airflow to reach the demanded torque based on the determined condensate level; and
controlling via the electronic controller an actuator to adjust a position of an air intake throttle to:
limit an increase in engine airflow to the determined rate of increase in engine airflow in response to a change in the pedal position greater than a threshold, and the determined condensate level in the charge air cooler greater than a first threshold level; and
not limit the increase in engine airflow to the determined rate in response to one or more of the change in the pedal position being less than the threshold and the determined condensate level being less than the first threshold level.

17. The method of claim 16, wherein the limiting the increase in engine airflow to the determined rate of increase in engine airflow includes setting a rate limit based on a target rate of condensate ingestion to reduce engine misfire.

18. The method of claim 16, wherein the controller stops the limiting in response to the determined condensate level in the charge air cooler decreasing below a second threshold level.

19. The method of claim 18, wherein limiting the increase in engine airflow includes clipping the engine airflow and further comprising, via the controller, transitioning from clipped airflow to no airflow limiting by controlling the actuator to increase an opening of the throttle following a controlled time constant to produce a demanded engine airflow in response to the determined condensate level in the charge air cooler decreasing below the second threshold level.

* * * * *